US009143694B2

(12) United States Patent
Misawa

(10) Patent No.: US 9,143,694 B2
(45) Date of Patent: Sep. 22, 2015

(54) CAMERA AND METHOD OF CONTROLLING OPERATION OF SAME

(71) Applicant: FUJIFILM Corporation, Tokyo (JP)

(72) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/592,769

(22) Filed: Jan. 8, 2015

(65) Prior Publication Data

US 2015/0116560 A1   Apr. 30, 2015

Related U.S. Application Data

(63) Continuation of application No. PCT/JP2013/065035, filed on May 30, 2013.

(30) Foreign Application Priority Data

Jul. 20, 2012   (JP) ................................. 2012-161752

(51) Int. Cl.
*H04N 5/232*   (2006.01)
*G03B 13/06*   (2006.01)
*G03B 13/10*   (2006.01)
(Continued)

(52) U.S. Cl.
CPC ............ *H04N 5/23293* (2013.01); *G03B 13/06* (2013.01); *G03B 13/10* (2013.01); *G03B 17/20* (2013.01); *H04N 5/2254* (2013.01); *H04N 5/369* (2013.01)

(58) Field of Classification Search
CPC . H04N 5/23293; H04N 5/369; H04N 5/2254; G03B 13/10; G03B 17/20; G03B 13/06
See application file for complete search history.

(56) References Cited

U.S. PATENT DOCUMENTS 5,161,025 A   11/1992   Nakao
5,579,080 A   11/1996   Irie et al.
(Continued)

FOREIGN PATENT DOCUMENTS

JP   3-292067 A   12/1991
JP   6-138364 A   5/1994
(Continued)

OTHER PUBLICATIONS

International Search Report, issued in PCT/JP2013/065035, dated Sep. 3, 2013.
(Continued)

*Primary Examiner* — Twyler Haskins
*Assistant Examiner* — Padma Haliyur
(74) *Attorney, Agent, or Firm* — Birch, Stewart, Kolasch & Birch, LLP

(57) ABSTRACT

An image of a subject formed optically by a objective lens (concave lens) and an eyepiece lens can be seen by a pupil. A light shielding plate is provided in front of part of the objective lens and a shielded region is formed by the light shielding plate. When the image of a subject is captured on a portion of the display screen of an electronic viewfinder, the image of the subject is reflected by a prism and can be seen superimposed upon the shielded region. If the pupil moves away from the optical axis of the virtual finder unit, the extent of the shielded region also shifts. In order to solve this problem, the light shielding plate is moved in accordance with the position of the pupil so that the extent of the shielded region is rendered constant despite movement of the pupil.

4 Claims, 12 Drawing Sheets

(51) Int. Cl.
*G03B 17/20* (2006.01)
*H04N 5/225* (2006.01)
*H04N 5/369* (2011.01)

(56) References Cited

U.S. PATENT DOCUMENTS

| | | | |
|---|---|---|---|
| 7,463,303 B2 * | 12/2008 | Ito | 348/353 |
| 8,063,971 B2 * | 11/2011 | Suda et al. | 348/333.09 |
| 2007/0126907 A1 * | 6/2007 | Stueckler | 348/333.01 |
| 2014/0375864 A1 * | 12/2014 | Miyagishima et al. | 348/333.09 |

FOREIGN PATENT DOCUMENTS

| | | |
|---|---|---|
| JP | 2001-134173 A | 5/2001 |
| JP | 2002-82278 A | 3/2002 |
| JP | 2012-65283 A | 3/2012 |

OTHER PUBLICATIONS

Written Opinion of the International Searching Authority, issued in PCT/JP2013/065035, dated Sep. 3, 2013.

* cited by examiner

CAMERA AND METHOD OF CONTROLLING OPERATION OF SAME

BACKGROUND OF THE INVENTION

This application is a Continuation of PCT International Application No. PCT JP2013/065035 filed on May 30, 2013, which claims priority under 35 U.S.C. §119(a) to Japanese Patent Application No. 2012-161752 filed Jul. 20, 2012. Each of the above application(s) is hereby expressly incorporated by reference, in its entirety, into the present application.

FIELD OF THE INVENTION

This invention relates to a camera and to a method of controlling the operation thereof.

DESCRIPTION OF THE RELATED ART

Optical finder devices include a finder referred to as a "virtual finder". A virtual finder uses a concave lens as an eyepiece lens and a convex lens as an objective lens. Optical finder devices can be assembled in small size. Further, finder devices include those having both an optical finder function for forming the optical image of a subject and allowing the user to observe the optical image of the subject, and an electronic viewfinder function for displaying the image of a subject, which has been obtained by imaging, on a liquid crystal display unit and allowing the user to observe the image of the subject.

There is also a system which displays a secondary image in a main image display area (Patent Document 1) and a system which detects the line of sight of the photographer and displays a ranging-point marker upon superimposing the marker on a position that corresponds to a line-of-sight position (Patent Document 2).

Patent Document 1: Japanese Patent Application Laid-Open No. 2001-134173
Patent Document 2: Japanese Patent Application Laid-Open No. 2002-82278

When one considers the fact that the optical image of a subject and the image of the subject displayed on the liquid crystal display unit are observed simultaneously in an optical/electronic hybrid viewfinder having both optical and electronic finder functions, as mentioned above, the insertion of a light shielding plate for blocking part of the emergent light from the objective lens is conceivable. By superimposing the image of the subject, which is displayed on the liquid crystal display unit, in the shielded region formed by the light shielding plate, the optical image of the subject and the image of the subject displayed on the liquid crystal display unit can be viewed side by side simultaneously. However, in the case of a virtual optical finder device, the shielded region shifts greatly when the pupil of the observer moves. As a consequence, the image of the subject being displayed on the liquid crystal display unit is not superimposed upon the shielded region so as to coincide with it. The shielded region will protrude excessively or the image of the subject being displayed on the liquid crystal display unit will overlap the optical image of the subject.

SUMMARY OF THE INVENTION

An object of the present invention is to arrange it so that the shielded region will remain constant even if the pupil of the observer moves. A camera according to the present invention comprises: a virtual finder device in which a concave lens is used as an objective lens and a convex lens is used as an eyepiece lens; a solid-state electronic image sensing device for imaging a subject and outputting image data representing the image of the subject; a display unit for displaying an image, which is at least a portion of the image of the subject imaged by the solid-state electronic image sensing device, on a display screen; a deflecting optical system, provided between the object lens and the eyepiece lens, for introducing the portion of the image, which is being displayed on the display screen of the display unit, to the eyepiece lens; a light shielding plate for blocking a portion of light emergent from the objective lens and being freely movable perpendicular to the optical axis of the objective lens; a position detection device (position detection means) for detecting position of the pupil of an observer brought near the eyepiece lens; a light shielding plate control device (light shielding plate control means) for controlling the light shielding plate so as to move the light shielding plate in accordance with position of the pupil of the observer detected by the position detection device; and a display control device (display control means) for controlling the display unit in such a manner that the deflecting optical system displays the portion of the image in such area of the display screen that overlaps a region shielded by the light shielding plate.

The present invention also provides an operation control method suited to the above-described camera. Specifically, the present invention provides a method of controlling operation of a camera having a virtual finder device in which a concave lens is used as an objective lens and a convex lens is used as an eyepiece lens, the method comprising steps of: a solid-state electronic image sensing device imaging a subject and outputting image data representing the image of the subject; a display unit displaying an image, which is at least a portion of the image of the subject imaged by the solid-state electronic image sensing device, on a display screen; a deflecting optical system, provided between the object lens and the eyepiece lens, introducing the portion of the image, which is being displayed on the display screen of the display unit, to the eyepiece lens; a light shielding plate blocking a portion of light emergent from the objective lens and being freely movable perpendicular to the optical axis of the objective lens; a position detection device detecting position of the pupil of an observer brought near the eyepiece lens; a light shielding plate control device controlling the light shielding plate so as to move the light shielding plate in accordance with position of the pupil of the observer detected by the position detection device; and a display control device controlling the display unit in such a manner that the deflecting optical system displays the portion of the image in such area of the display screen that overlaps a region shielded by the light shielding plate.

In accordance with the present invention, a camera is provided with a light shielding plate which blocks a portion of light emergent from an objective lens and which is freely movable perpendicular to the optical axis of the objective lens. The position of an observer's pupil brought close to an eyepiece lens is detected and the light shielding plate is moved in accordance with the position of the pupil. Since the light shielding plate is moved in accordance with the position of the pupil of the observer, the shielded region is held constant at all times. Since movement of the observer's pupil is no longer accompanied by an increase or decrease in the size of the shielded region, the shielded region and an image that is a portion of the image of a subject superimposed upon the shielded region will always coincide.

By way of example, in response to movement of the position of the pupil of the observer, which is detected by the position detection device, from the optical axis of the virtual finder device, the light shielding plate control device controls the light shielding plate so as to move the light shielding plate in the direction of this movement.

By way of example, the light shielding plate is positioned at a position at any one of four corners of an optical image of a subject formed by the virtual finder device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
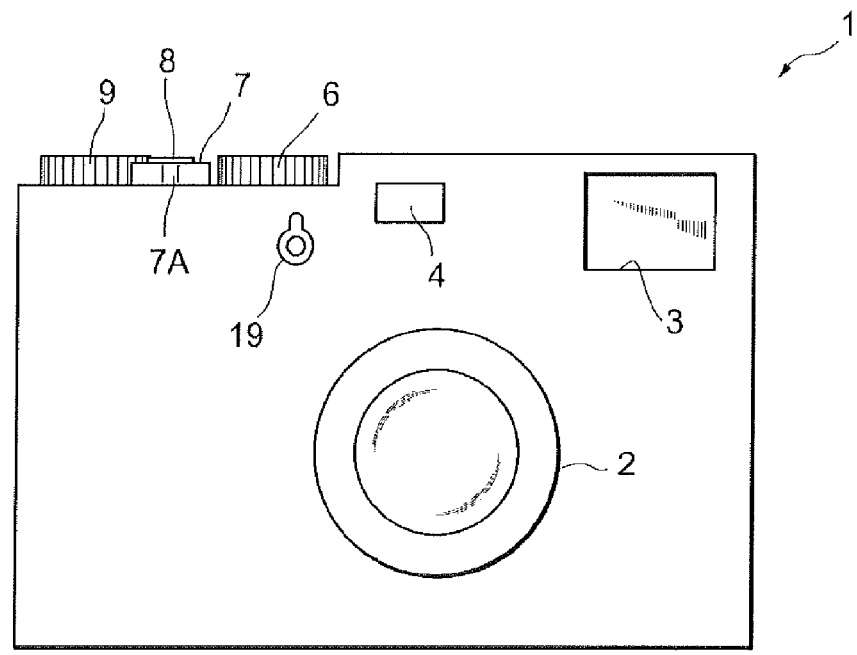
FIG. 1 is a front view of a digital camera.
Figure 2:
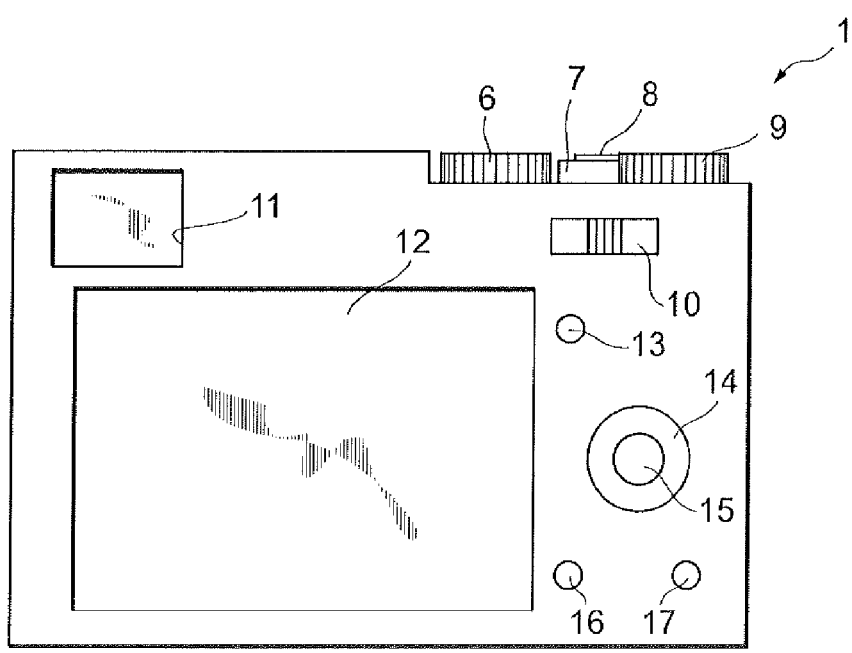
FIG. 2 is a back view of the digital camera.
Figure 3:
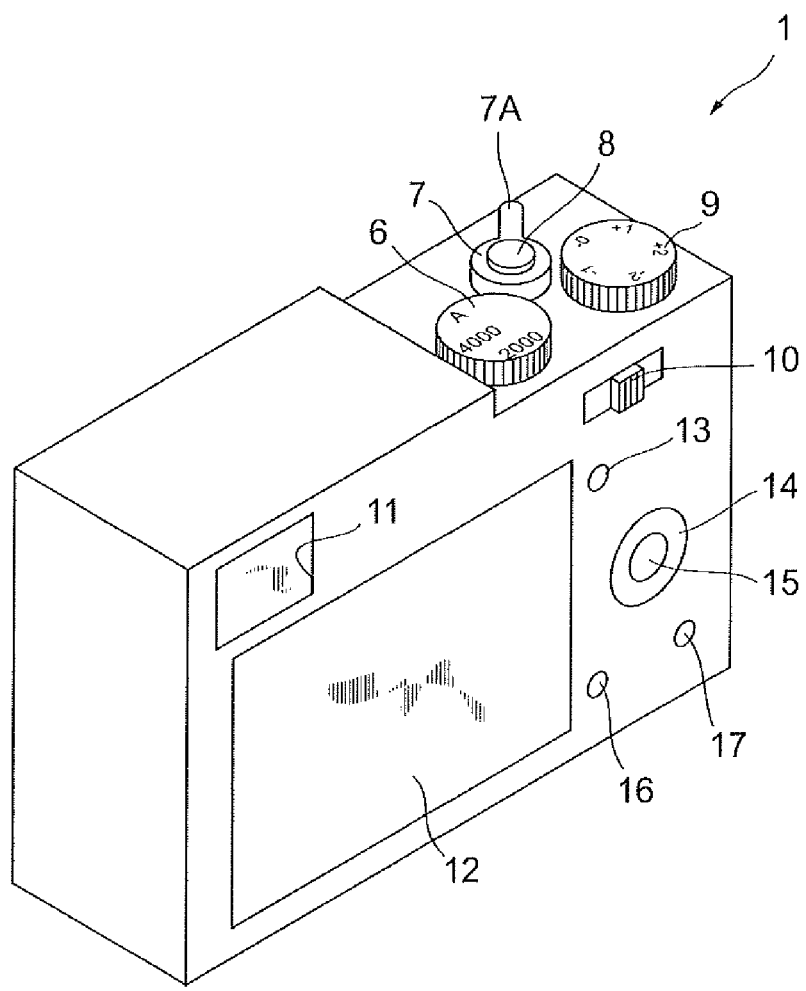
FIG. 3 is a perspective view of the digital camera when viewed from the back.

FIGS. 1 to 3, which illustrate an embodiment of the present invention, show the external appearance of a digital camera 1. FIG. 1 is a front view, FIG. 2 a back view and FIG. 3 a perspective view when viewed from the back.

With reference to FIG. 1, a lens barrel 2 projects forwardly from the approximate center of the front side of the digital camera 1. A finder unit is constructed at the upper right of the digital camera 1 and is formed to include an objective window 3 facing a subject. A flash device 4 is provided on the left side of the objective window 3. The finder unit of this embodiment is capable of being switched among an optical viewfinder function, an electronic viewfinder function and an optical/electronic hybrid viewfinder function. As will be described later in greater detail, the optical viewfinder function allows the user, who is looking through the finder unit, to observe the optical image of a subject formed by an objective lens and an eyepiece lens that are included in the finder unit. The electronic viewfinder function displays the image of a subject, which have been imaged using a solid-state electronic image sensing device, on a liquid crystal display unit and allows the user, who is looking through the finder unit, to observe the displayed image of the subject. The optical/electron c hybrid viewfinder function allows the user, who is looking through the finder unit, to observe the optical image of a subject obtained by the optical viewfinder and the image of the subject displayed in the electronic viewfinder. A switching lever 19 for switching among the optical viewfinder function, electronic viewfinder function and optical/electronic hybrid viewfinder function is provided on the left side of the flash device 4. If the switching lever 19 is tilted leftward when viewed from the front, the finder unit is set to the optical viewfinder function. If the switching lever 19 is positioned at a central position when viewed from the front, the optical/electronic hybrid viewfinder function is set. If the switching lever 19 is tilted rightward when viewed from the front, the finder unit is set to the electronic viewfinder function.

A shutter-speed dial 6, a power lever 7, a shutter-release button 8 and an exposure dial 9 are provided on the top of the digital camera 1 on the left side thereof when viewed from the front. The shutter-speed dial 6 is a circular dial that is free to rotate. By rotating the shutter-speed dial 6, the user can set a desired shutter speed. The power lever 7 can be moved through a prescribed angle rightward and leftward as seen from the front. By moving the power lever 7 through the prescribed angle, the user can turn the power supply of the digital camera 1 on and off. The power lever 7 has the shape of a ring with an interior space when viewed from the top (see FIG. 3), and the shutter-release button 8 is provided within the space. The exposure dial 9 also is a circular dial that is free to rotate. By turning the exposure dial 9, the user can correct the exposure.

With reference to FIGS. 2 and 3, a liquid crystal display device 12 is provided on the back side of the digital camera 1 substantially over the entirety thereof. An eyepiece window 11 constituting the finder unit is formed on the back side of the digital camera 1 at the upper left thereof. A command lever 10 movable to the left and right is provided on the back side of the digital camera 1 at the upper right thereof. By manipulating the command lever 10, the user can supply the digital camera 1 with a command such as an aperture adjustment command in steps of ⅓ EV when the camera is in the manual exposure mode.

Provided below the command lever 10 are an AF (autofocus)/AE (autoexposure) lock button 13, a command dial 14, a menu/OK button 15, a back button 16 and a RAW button 17, etc.

With reference primarily to FIG. 3, the shutter-speed dial 6, power lever 7, shutter-release button 8 and exposure dial 9 are provided on the top of the digital camera 1 on the right side thereof (the right side when viewed from the back), as mentioned above. The power lever 7 is formed to have a projection 7A projecting toward the front side. The power supply of the digital camera 1 can be turned on and off by grasping the projection 7A and moving it to the right or left.

By bringing an eye close to the eyepiece window 11 of the finder unit and looking at the eyepiece window 11, the user can view a subject through the objective window 3 and eyepiece window 11 and can decide the camera angle.

Figure 4:
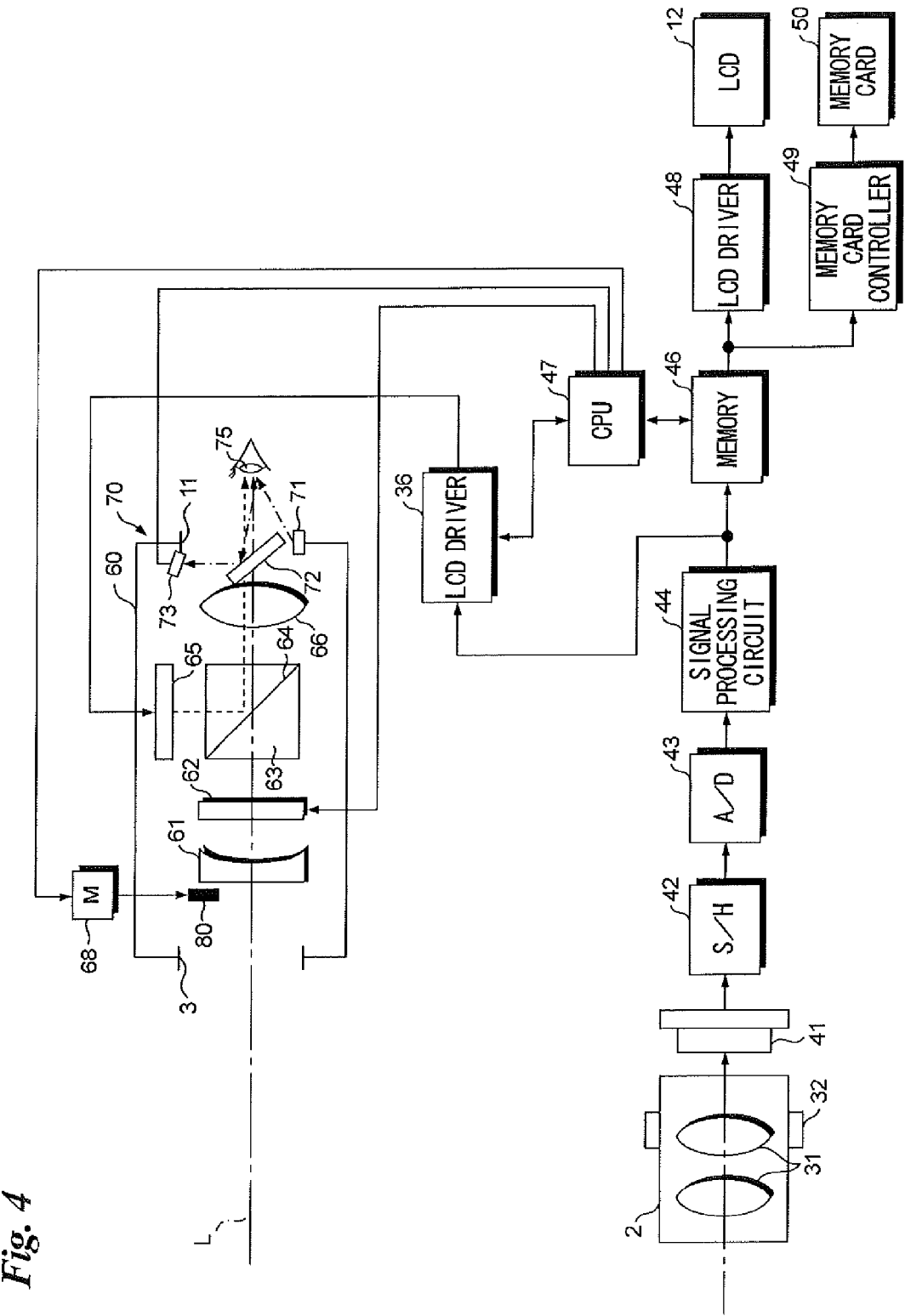
FIG. 4 is a block diagram illustrating the electrical configuration of the digital camera.

FIG. 4 is a block diagram illustrating the electrical configuration of the digital camera 1.

The overall operation of the digital camera 1 is controlled by a CPU 47.

The digital camera 1 includes a solid-state electronic image sensing device 41. A focusing lens group 31 incorporated in the lens barrel 2 is positioned in front of the solid-state electronic image sensing device 41. A freely rotatable focusing ring 32 is provided around the lens barrel 2. The focusing lens group 31 is positioned in accordance with user manipulation of the focusing ring 32.

When a subject is imaged by the solid-state electronic image sensing device 41, a video signal representing the image of the subject is output from the solid-state electronic image sensing device 41. The video signal is input to an analog/digital conversion circuit 43 via a sample/hold circuit 42. The video signal is converted to digital image data by the analog/digital conversion circuit 43. A signal processing circuit 44 subjects the digital image data obtained by the conversion to predetermined signal processing such as a white balance adjustment and gamma correction.

The digital image data that has been output from the signal processing circuit 44 is applied to an LCD (Liquid Crystal Display) driver 48 via a memory 46. The liquid crystal display device 12 (the same reference characters are used to denote the display screen) is controlled by the LCD driver 48 and the image of the subject captured by the solid-state electronic image sensing device 41 is displayed on the display screen of the liquid crystal display device 12.

When the shutter-release button 8 is pressed, the image data that has been input to the memory 46, as mentioned above, is recorded on a memory card 50 under the control of a memory card controller 49.

The image data that has been output from the signal processing circuit 44 is applied to an electronic viewfinder 65 of a finder unit 60 via an LCD driver 36. The electronic viewfinder 65 is a liquid crystal display device. Thus it becomes possible to display the image of the subject, which has been obtained by imaging, on a display screen 65A of the electronic viewfinder 65.

The finder unit 60 is provided with an eyepiece lens 66 provided in front of the eyepiece window 11. A prism 63 formed to have a half-mirror 64 is provided in front of the eyepiece lens 66. The half-mirror 64 is formed so as to have a 45-degree angle of incidence with respect to optical axis L of the finder unit 60. An OVF (optical viewfinder) shutter (which may be a mechanical shutter or a liquid crystal shutter) 62 and an objective lens 61 are provided in front of the prism 63. Opening and closing of the OVF are controlled by the CPU 47. If the OVF shutter 62 is a liquid crystal shutter, an LCD driver for controlling the liquid crystal shutter would be provided.

A concave lens and a convex lens are used as the objective lens 61 and eyepiece lens 66, respectively, included in the finder unit 60. The finder unit 60 has the function of a virtual optical finder.

Provided in front of the objective lens 61 is a light shielding plate 80 for blocking a portion of the light that impinges upon the objective lens 61 (a portion of the light that emerges from the objective lens 61). The light shielding plate 80 is freely movable so that it can be advanced and withdrawn along a direction perpendicular to the optical axis L of the finder unit 60 by a motor 68 controlled by the CPU 47.

A detection unit 70 for detecting the position of user's pupil looking through the eyepiece window 11 is provided near the eyepiece window 11 in finder unit 60. The detection unit 70 is provided with a light-emitting unit 71 for emitting light toward the eye of the user. The light emitted by the light-emitting unit 71 is reflected at the user's pupil and is further reflected by a half-mirror 72. The light reflected by the half-mirror 72 is impinges upon an area sensor 73. The position of the pupil is detected based upon the position at which the light impinges upon the area sensor 73.

Figure 5:
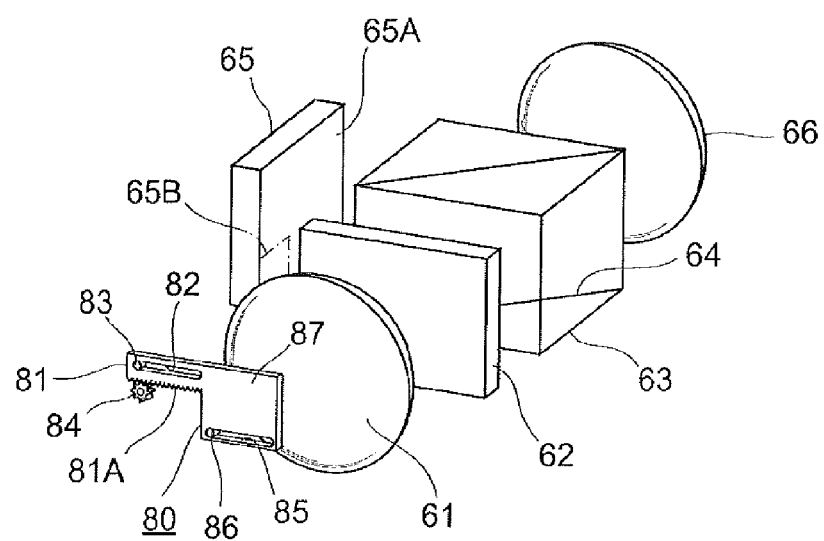
FIG. 5 is an exploded perspective view of a finder unit and a front view illustrating the relationship between a light shielding plate and a prism.
Figure 5:
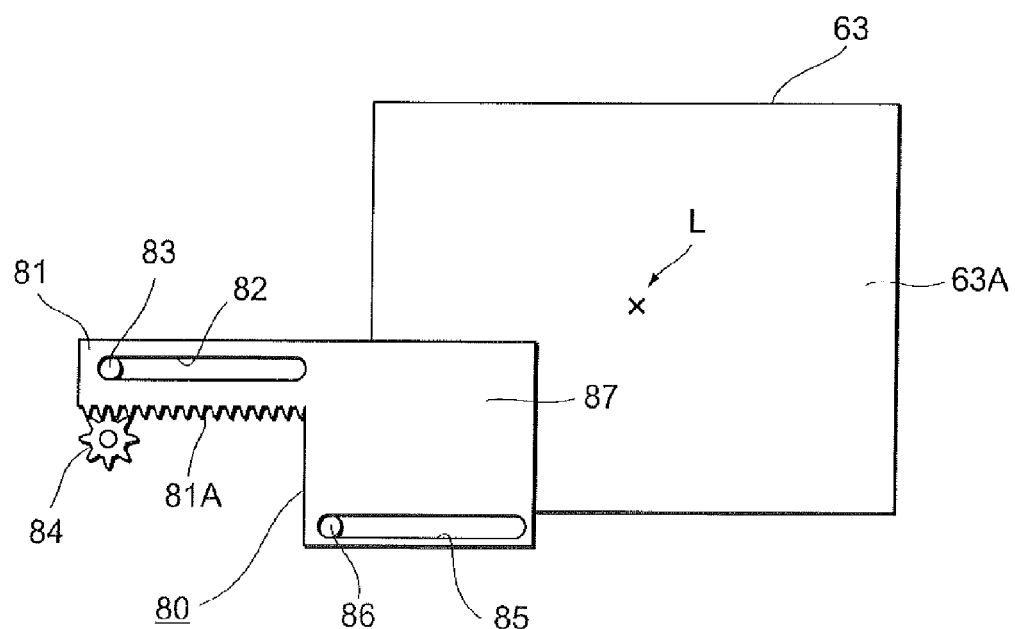

The diagram at the top of FIG. 5 is a perspective view illustrating the internal configuration of the finder unit 60. In order to facilitate understanding, the motor 68 for moving the light shielding plate 80 and the detection unit 70 are not shown in the diagram at the top of FIG. 5. The diagram at the bottom of FIG. 5 shows how the objective lens 61 looks when seen from the front of the finder unit 60 (from the side of the objective window 3) and illustrates the relationship between the light shielding plate 80 and the prism 63.

The light shielding plate 80 has a shielding portion 87 for blocking light, and a protrusion 81 the lower portion of which is formed to have a rack 81A for moving the light shielding plate 80 to the left and right (in the direction perpendicular to the optical axis L). The protrusion 81 has a slide groove 82 into which a limiting pin 83 is fitted. The lower portion of the shielding portion 87 also has a slide groove 85 into which a limiting pin 86 is fitted. A gear 84 the rotation of which is controlled by the above-mentioned motor 68 is in mesh with the rack 81A. Owing to rotation of the gear 84, the light shielding plate 80 is moved to the left and right while the horizontal attitude thereof is maintained by the limiting pins 83, 86.

The prism 63 has a front face 63A a portion of which is shielded from light by the light shielding plate 80. The extent of shielding differs depending upon the amount of movement of the light shielding plate 80.

Although the light shielding plate 80 is provided so as to shield the lower-left corner of the front face 63A of the prism 63 as viewed from the front, the light shielding plate 80 may be provided so as to shield the lower-right corner, upper-left corner or upper-right corner.

With reference again to FIG. 4, the OVF shutter 62 closes when the camera is set to the electronic viewfinder function. The image of the subject obtained by image capture is displayed on the entire display screen 65A of the electronic viewfinder 65 (see the diagram as the top of FIG. 5). The displayed image of the subject is reflected by and introduced to the eyepiece window 11 by the half-mirror 64 formed in the prism 63. The user looking through the eyepiece window 11 sees the image of the subject being displayed on the display screen 65A of the electronic viewfinder 65.

When the camera is set to the optical viewfinder function, the OVF shutter 62 opens. Further, the light shielding plate 80 is completely withdrawn from the front face of the objective lens 61 (the front face 63A of the prism 63). The user sees the image of the subject, which is formed by the objective lens 61 and the eyepiece lens 66, through the eyepiece window 11.

When the camera is set to the optical/electronic hybrid viewfinder function, the OVF shutter 62 opens. Further, the light shielding plate 80 advances over part of the front face of the objective lens 61 (front face 63A of the prism 63). As a result, a shielded region is formed on the front face 63A of the prism 63. Furthermore, the image of the subject (a portion thereof) obtained by image capture is displayed in an area 65B (see the diagram at the top of FIG. 5) which is a portion of the display screen 65A of the electronic viewfinder 65. The image of the subject (a portion thereof) displayed in the area 65B is reflected by and introduced to the eyepiece window 11 by the half-mirror 64 formed in the prism 63. The image of the subject (a portion thereof) displayed in the area 65B can be seen superimposed upon the shielded region formed on the front face 63A of the prism 63. Looking through the eyepiece window 11, the user sees, side by side and simultaneously, both the image of the subject formed by the objective lens 61 and the eyepiece lens 66 and the image of the subject (a portion thereof) displayed in the area 65B.

The top views of FIGS. 6, 7, 8, 9, 10, 11 and 12 are examples of images seen when looking through the eyepiece window 11 of finder unit 60. The diagrams at the bottom of FIGS. 6, 7, 8, 9, 10, 11 and 12 illustrate how the finder unit 60 looks when viewed from a plane.

Figure 6:
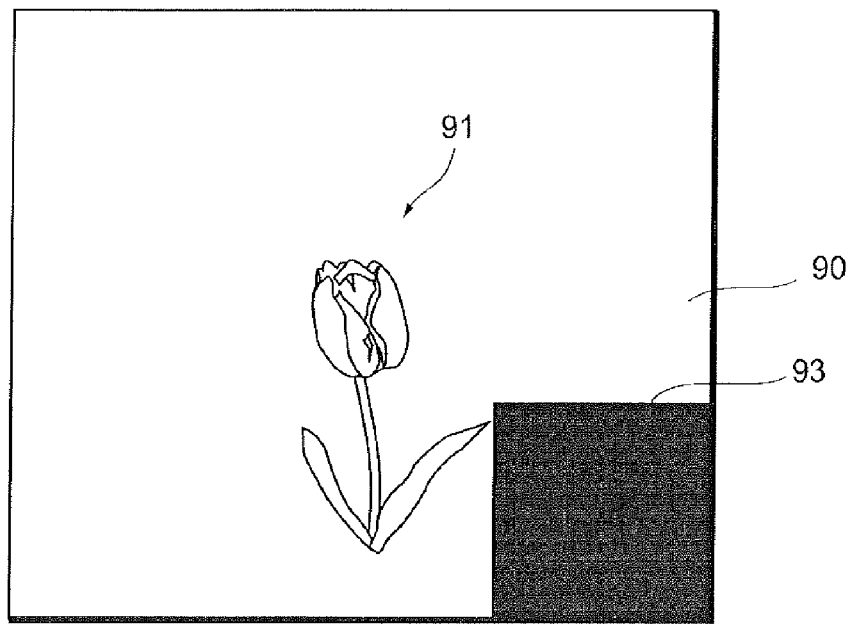
FIGS. 6 to 12 are examples of images seen by looking through a finder unit and illustrate how the finder unit looks when viewed from a plane.
Figure 6:
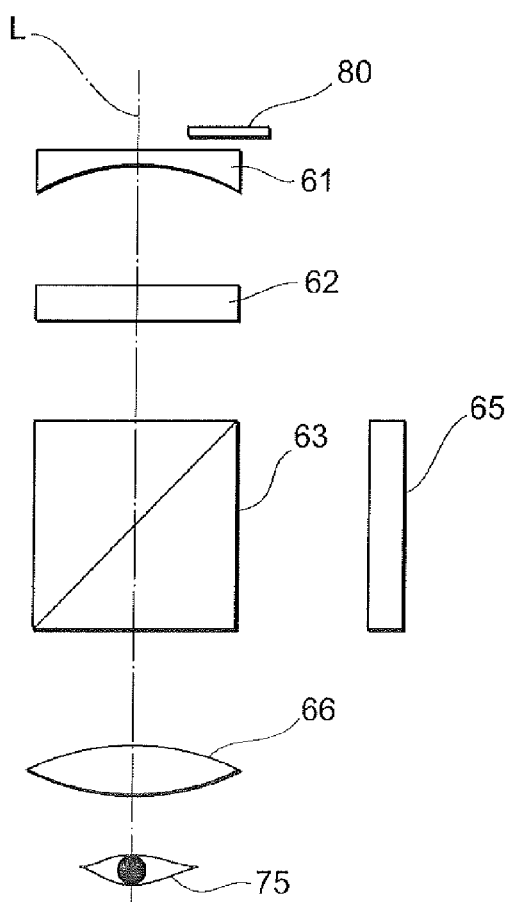

An image 90 shown at the top of FIG. 6 is one seen when the OVF shutter 62 of finder unit 60 is open and, moreover, the light shielding plate 80 has been advanced over the front face of the objective lens 61 in the direction toward the optical axis L. Further, at the time nothing is being displayed on the display screen 65A (inclusive of the display area 65B) of the electronic viewfinder 65.

Since the OVF shutter 62 is open, the user, by positioning his pupil on the optical axis L of the finder unit 60 and looking through the eyepiece window 11, can see an optical image 91 of a subject formed by light rays that have passed through the objective window 3 and been transmitted by the objective lens 61, the prism 63 and the eyepiece lens 66. Since the light shielding plate 80 has been advanced to a point in front of the objective lens 61, the shielded region is formed by the light shielding plate 80 in the manner described above. In a case where nothing is being displayed on the display screen 65A of the electronic viewfinder 65, an image 93 of the shielded region of the screen can also be seen.

Figure 7:
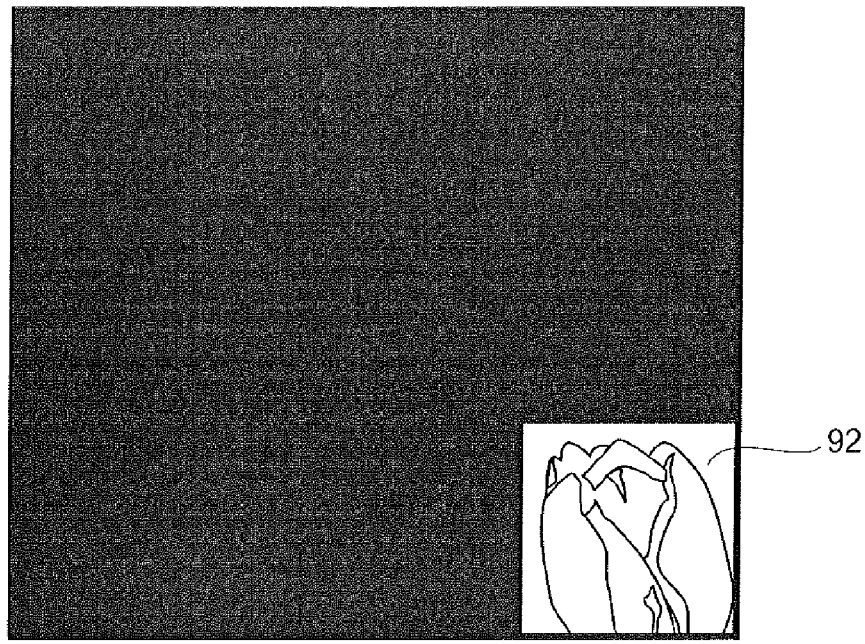
Figure 7:
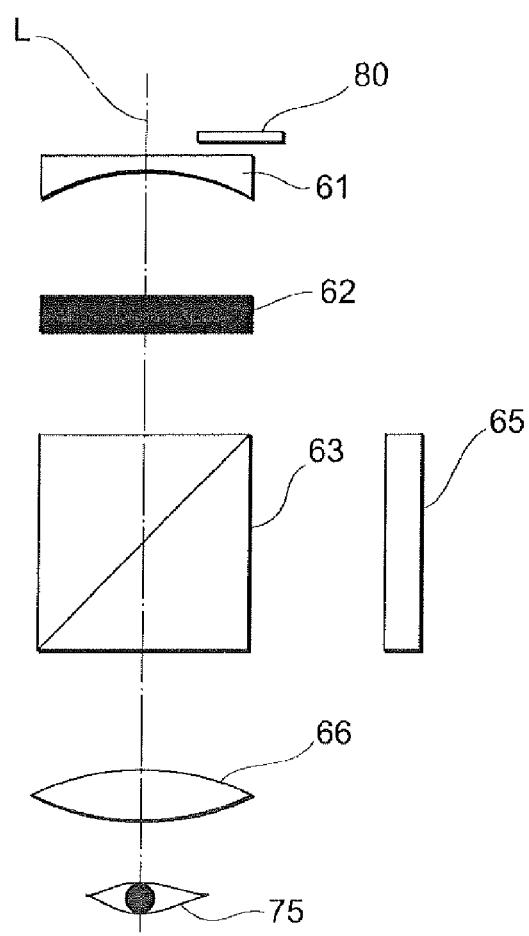

The top view of FIG. 7 is an example of the image 90 in a case where the OVF shutter 62 of finder unit 60 is closed. Specifically, with the OVF shutter 62 closed, the image 90 can be seen when the user looks through the eyepiece window 11 of the finder unit 60 at such time that a portion of the image of the subject captured by the solid-state electronic image sensing device 41 is displayed in the display area 65B of the electronic viewfinder 65.

Since the OVF shutter 62 is closed (in the diagram at the bottom of FIG. 7, the OVF shutter 62 is shown in black fill in order to indicate that the OVF shutter 62 is closed), an optical image 62 of the OVF shutter 62 can be seen. Further, since the optical image of the subject captured by the solid-state electronic image sensing device 41 is displayed in the display area 65B of the electronic viewfinder 65, this subject image 92 is being displayed in the lower-right corner. Thus, when the image of the subject is displayed in the display area 65B of the electronic viewfinder 65, the user can see the subject image 92 by positioning his pupil 75 on the optical axis L of the finder unit 60.

Figure 8:
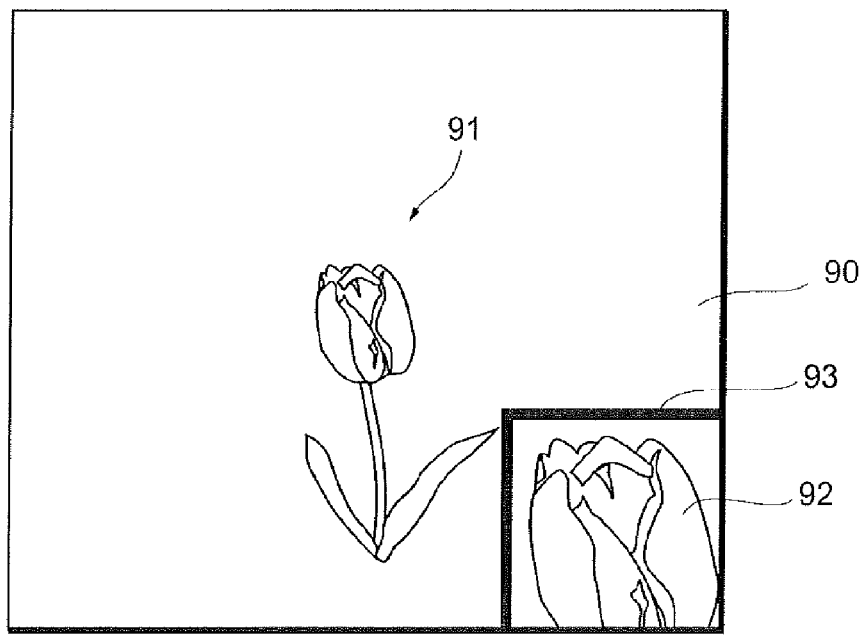
Figure 8:
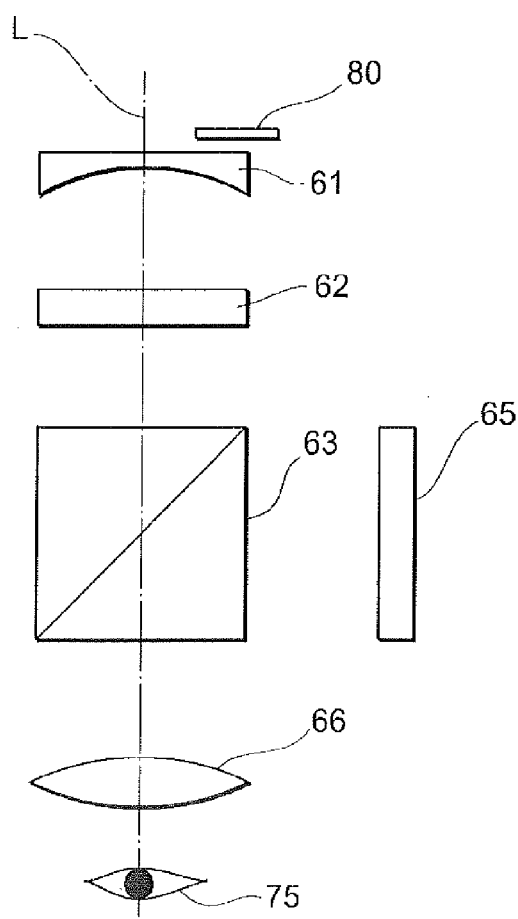

The top view of FIG. 8 is an example of the image 90 seen by the user looking through the finder unit 60 when the light shielding plate 80 has been advanced over the front face of the objective lens 61, the OVF shutter 62 is open and, moreover, the image of the subject is being displayed in the display area 655 of the electronic viewfinder 65 (namely this is when the camera has been set to the optical/electronic viewfinder function).

Since the OVF shutter 62 is open, the optical image 91 of the subject formed by the objective lens 61 and eyepiece lens 66, etc., can be seen, as described above. Further, since the shielded region 93 has been formed by the light shielding plate 80, the image 92 of the subject superimposed upon the shielded region 93 can be viewed owing to the fact that the image 92 of the subject is being displayed in the display area 655 of the electronic viewfinder 65. Thus, by positioning his pupil 75 on the optical axis L of the finder unit 60, the user can see, side by side and simultaneously, the optical image 91 of the subject and the image 92 of the subject (a portion thereof) imaged by the solid-state electronic image sensing device 41.

Figure 9:
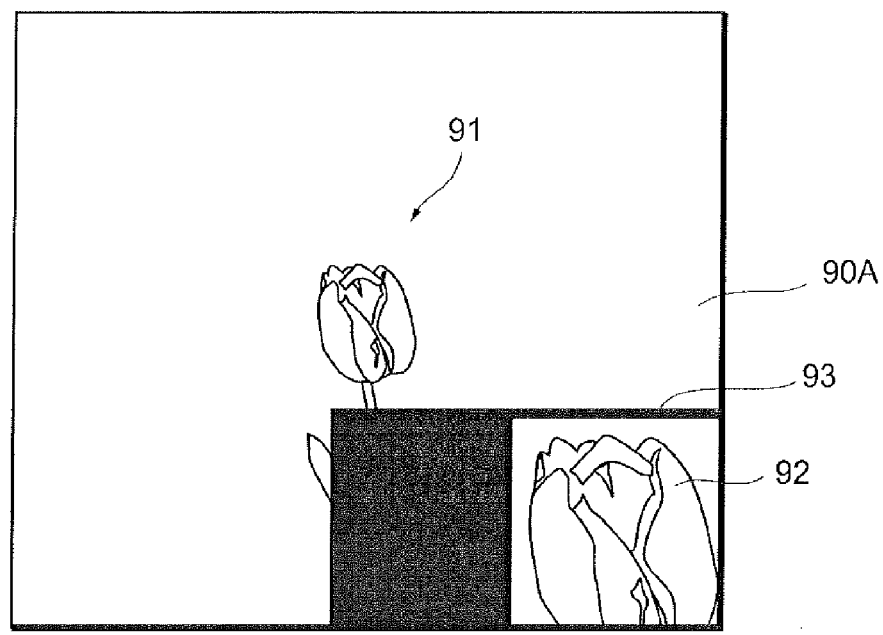
Figure 9:
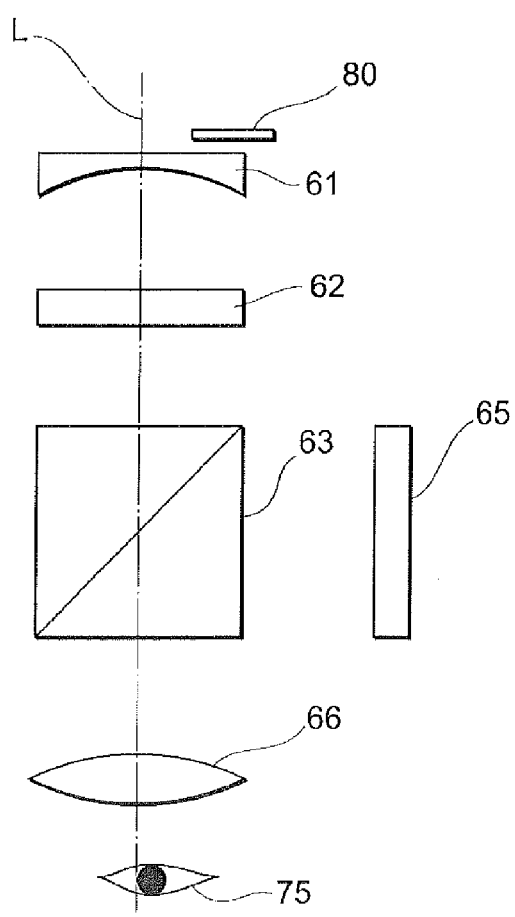

In the top view of FIG. 9, the light shielding plate 80 has been advanced over the front face of the objective lens 61, the OF shutter 62 is open and, moreover, the image of the subject is being displayed in the display area 65B of the electronic viewfinder 65, in a manner similar to that shown at the top of FIG. 8. In this example, however, the image 90 is seen by looking through the finder unit 60 when the pupil 75 of the user has been offset to the right side of the optical axis L of the finder unit 60 as shown by the diagram at the bottom of FIG. 9.

Since the finder unit 60 is a virtual finder constituted by the objective lens 61, which is a concave lens, and the eyepiece lens 66, which is a convex lens, as described above, it so happens that the extent of the shielded region 93 formed when the pupil 75 is shifted to the right side of the optical axis L when viewed from the back of the camera (the left side when viewed from the front of the camera), as illustrated by the diagram at the bottom of FIG. 9, increases greatly on the left side, as shown at the top of FIG. 9. As a consequence, it so happens that the shielded region 93 comes into view on the left side of the image 92 of the subject being superimposed upon the shielded region 93. Hence the area of the optical subject image 91 hidden by the shielded region 93 increases.

Figure 10:
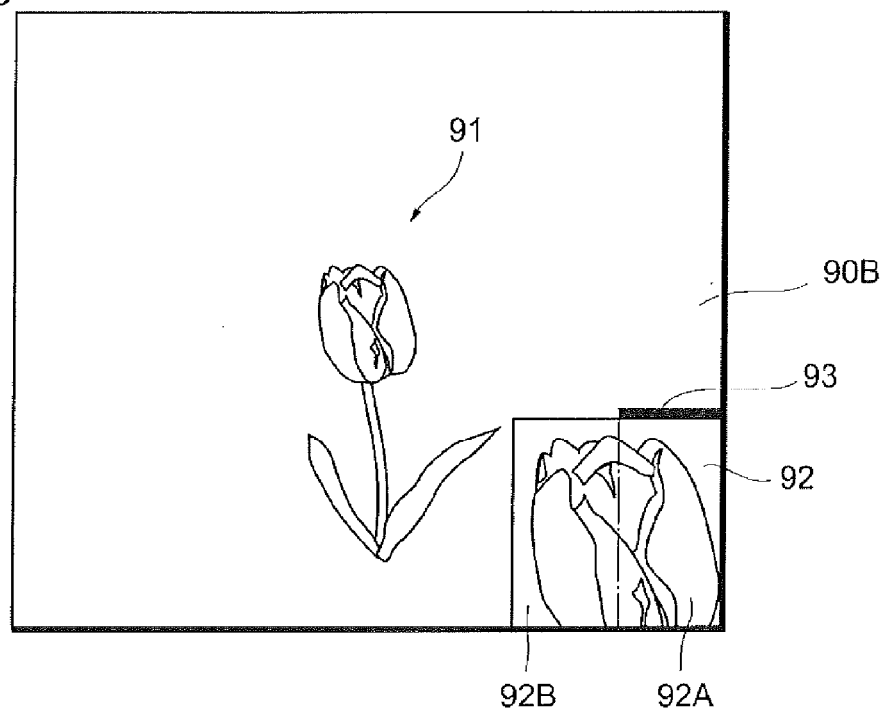
Figure 10:
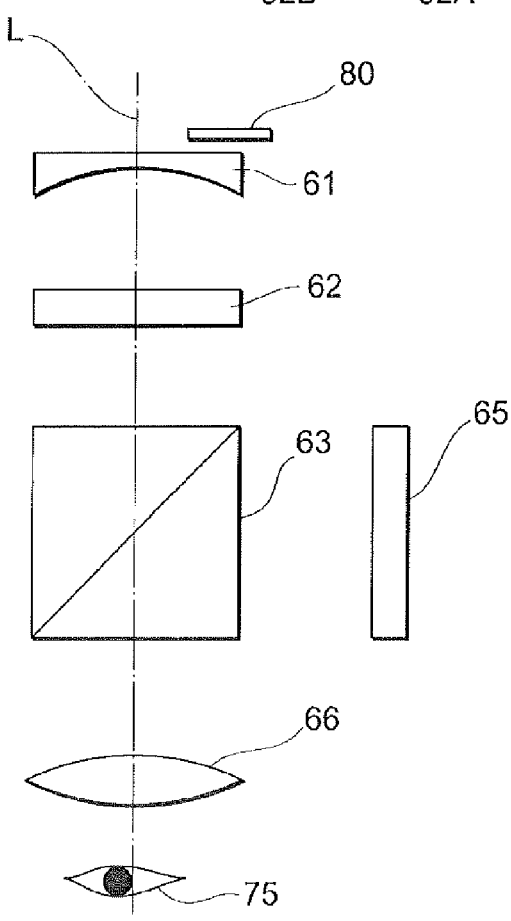

In the top view of FIG. 10, the light shielding plate 80 has been advanced over the front face of the objective lens 61, the OVF shutter 62 is open and, moreover, the image of the subject is being displayed in the display area 65B of the electronic viewfinder 65, in a manner similar to that shown at the top of FIG. 8. In this example, however, the image 90 is seen by looking through the finder unit 60 when the pupil 75 of the user has been offset to the left side of the optical axis L of the finder unit 60 as shown by the diagram at the bottom of FIG. 10.

Since the finder unit 60 is a virtual finder constituted by the objective lens 61, which is a concave lens, and the eyepiece lens 66, which is a convex lens, as described above, it so happens that the extent of the shielded region 93 formed when the pupil 75 is shifted to the left side of the optical axis L when viewed from the back of the camera the left side when viewed from the front of the camera), as illustrated by the diagram at the bottom of FIG. 10, contracts greatly toward the right side, as shown at the top of FIG. 10. As a consequence, the image 92 of the subject representing the image of the subject being displayed in the electronic viewfinder 65 includes a portion 92A superimposed upon the shielded region 93 and a portion 92B superimposed upon the optical image 91 of the subject. The portion 92B superimposed upon the optical image 91 of the subject does not overlap the shielded region 93 and therefore is unattractive.

Thus, the size of the shielded region 93 changes owing to the fact that the pupil 75 of the eye looking through the finder unit 60 shifts from the optical axis L. Consequently, the unwanted shielded region 93 is produced (see the top view in FIG. 9) or the image 92 of the subject presents an unattractive appearance (see the top view in FIG. 10). In this embodiment, the position of the pupil 75 is detected and the position of the light shielding plate 80 is decided in such a manner that the extent of the shielded region 93 is rendered constant regardless of the detected pupil position.

Figure 11:
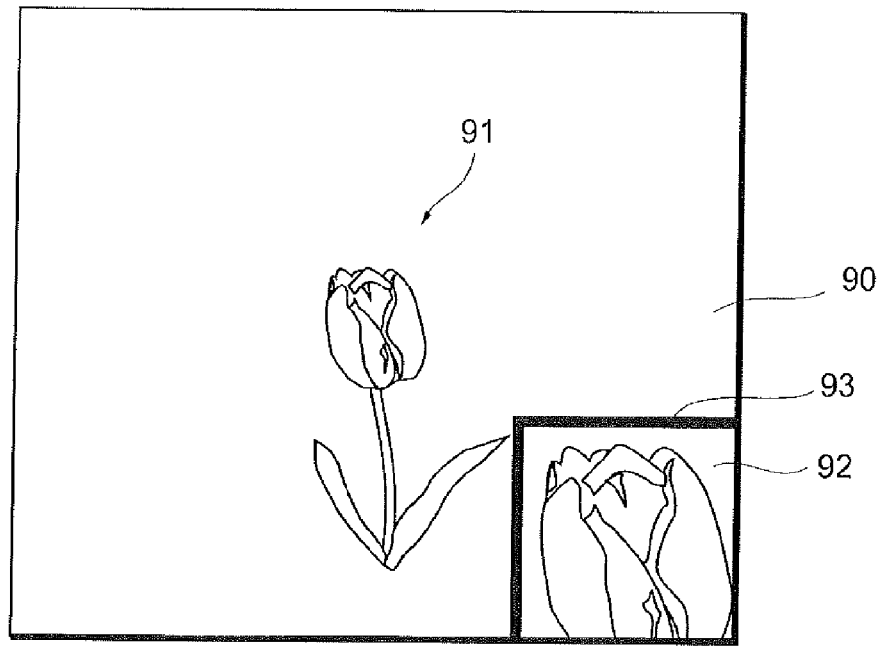
Figure 11:
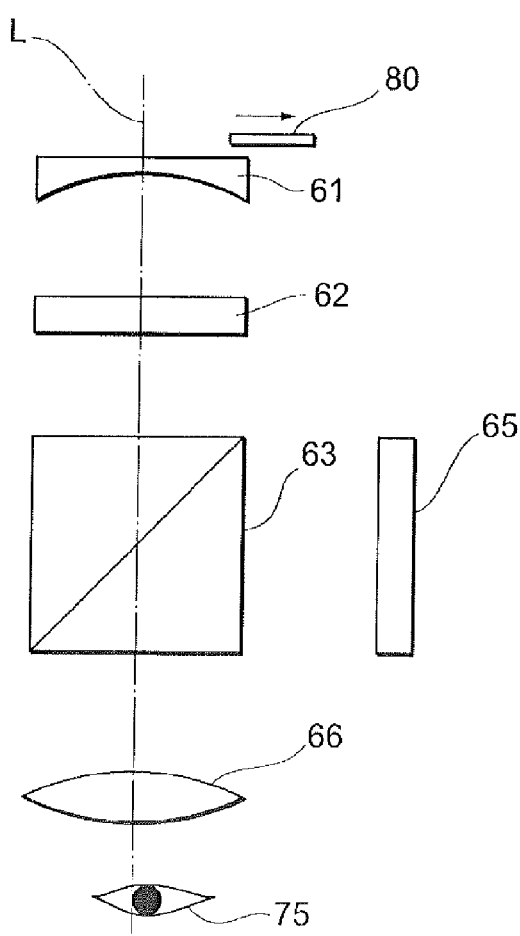

With reference to the diagram at the bottom of FIG. 11, assume that the above-described detection unit 70 has detected that the pupil 75 has shifted to the right side of the optical axis L of the finder unit 60, as viewed from the back of the camera, in a manner similar to that shown by the diagram at the bottom of FIG. 9. In response, the light shielding plate 80 is moved toward the right side when viewed from the hack of the camera. As a result, as illustrated in the top view of FIG. 11, the extent of the shielded region 93 becomes the same as that when the pupil 75 lies on the optical axis L.

Figure 12:
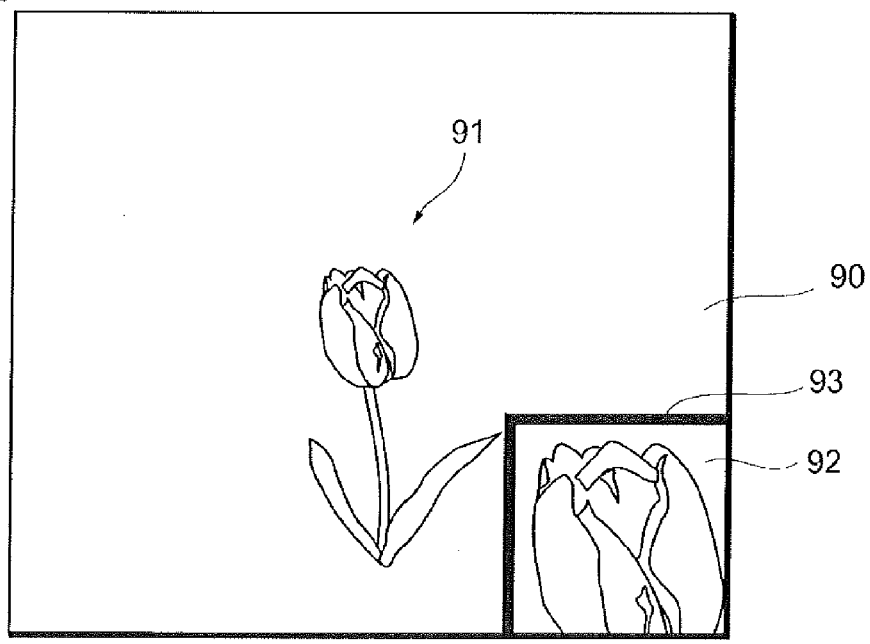
Figure 12:
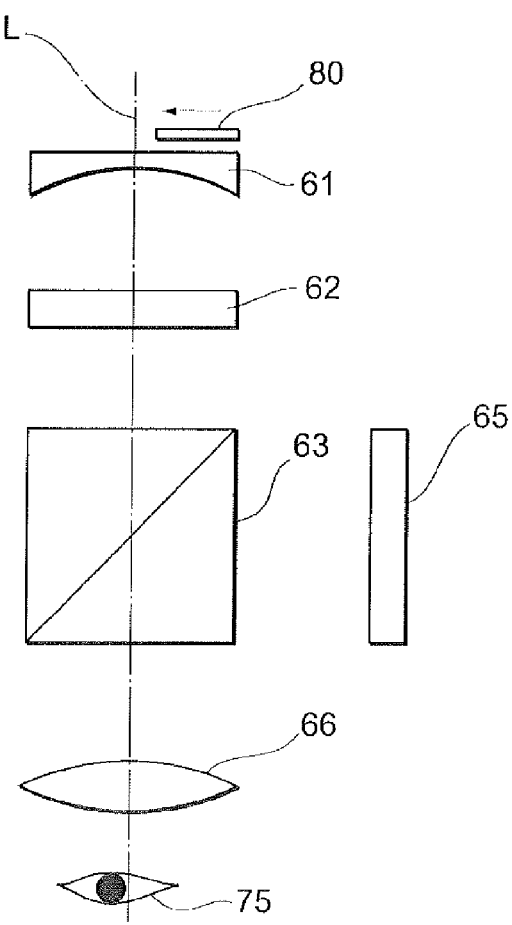

With reference to the diagram at the bottom of FIG. 12, assume that the pupil 75 has shifted to the left side of the optical axis L of the finder unit 60, as viewed from the back of the camera, in a manner similar to that shown by the diagram at the bottom of FIG. 10.

In response, the light shielding plate 80 is moved toward the left side when viewed from the back of the camera. As a result, as illustrated in the top view of FIG. 12, the extent of the shielded region 93 becomes the same as that when the pupil 75 lies on the optical axis L. Thus, the shielded region 93 having a constant size can be formed regardless of the position of the pupil 75. It goes without saying that the relationship between the position of the pupil 75 and the amount of movement of the light shielding plate 80 is decided beforehand by trial and error at camera fabrication stage.

Figure 13:
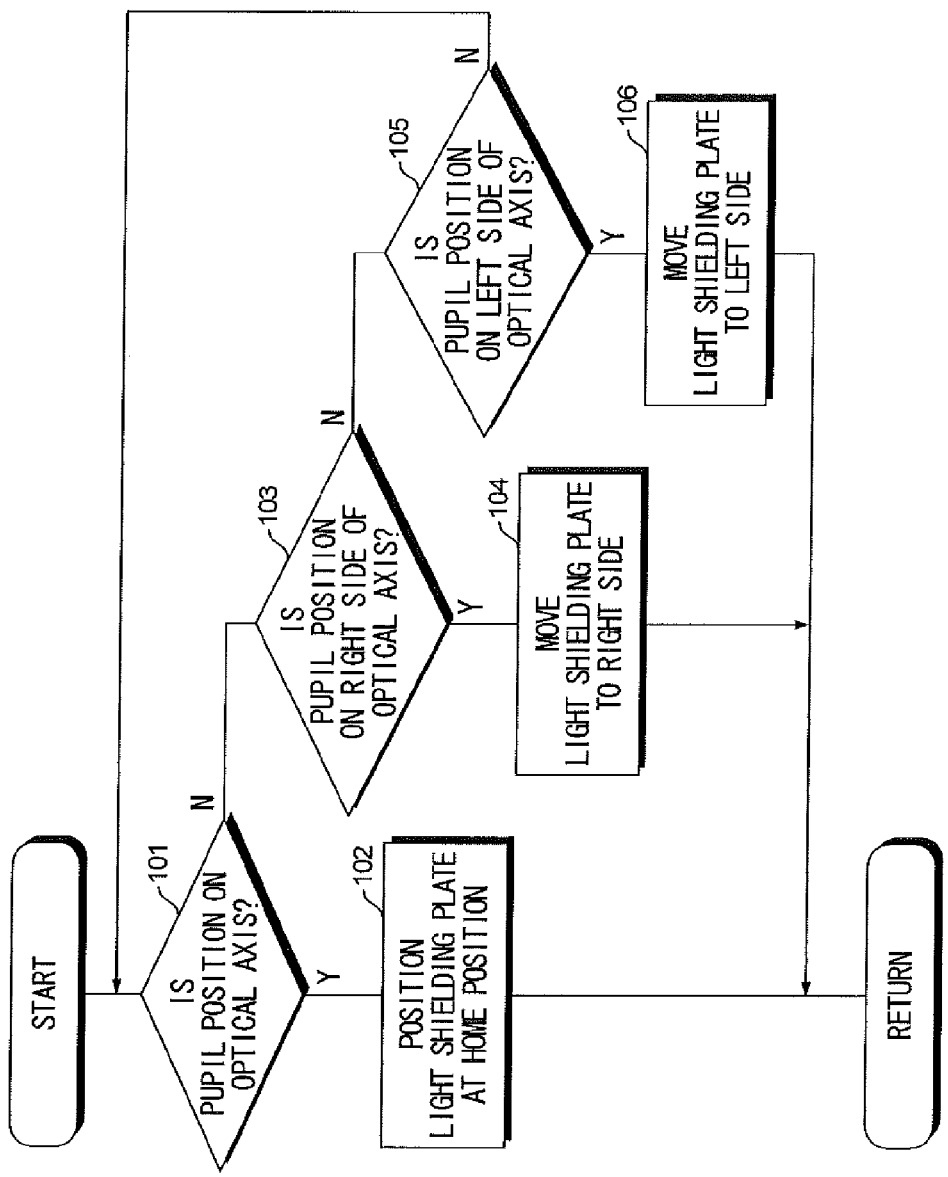
FIG. 13 is a flowchart illustrating processing executed by the digital camera.

FIG. 13 is a flowchart illustrating processing executed by a digital camera when it has been set to the optical/electron hybrid viewfinder function. Since the optical/electronic hybrid viewfinder function has been set, the OVF shutter 62 is open and the image of the subject is being displayed in the area 655 of the electronic viewfinder 65 in the manner described above.

Whether the pupil position is on the optical axis of the finder unit 60 is detected by the detection unit 70 (step 101). If the pupil position is on the optical axis of the finder unit 60 ("YES" at step 101), the light shielding plate 80 is positioned at a position (the home position) where the shielded region 93 will take on a predetermined size (for example, the size of the area 65B of the electronic viewfinder 65 (step 102). The user can see the image 92 of the subject in substantial agreement with the shielded region 93, as shown in FIG. 8.

If the pupil position is not on the optical axis of the finder unit 60 ("NO" at step 101), then it is determined whether the pupil position is on the right side of the optical axis L as viewed from the back of the camera (step 103). If the pupil position is on the right side ("YES" at step 103), the light shielding plate 80 is moved to the right side, as viewed from the back of the camera, by an amount commensurate with the position of the pupil 75 (step 104).

If the pupil position is not on the right side of the optical axis L as viewed from the back of the camera ("NO" at step 103), then it is determined whether the pupil position is on the left side of the optical axis L as viewed from the back of the camera (step 105). If the pupil position is on the left side ("YES" at step 105), the light shielding plate 80 is moved to the left side, as viewed from the back of the camera, by an amount commensurate with the position of the pupil 75 (step 106) as described above.

In the foregoing embodiment, the light shielding plate 80 is moved to the left and right as viewed from the front of the camera. However, it goes without saying that it may be arranged so that the light shielding plate 80 is moved up and down or diagonally and not to the left and right.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
    a virtual finder device in which a concave lens is used as an objective lens and a convex lens is used as an eyepiece lens;
    a solid-state electronic image sensing device for imaging a subject and outputting image data representing the image of the subject;
    a display unit for displaying an image, which is at least a portion of the image of the subject imaged by said solid-state electronic image sensing device, on a display screen;
    a deflecting optical system, provided between the object lens and the eyepiece lens, for introducing the portion of the image, which is being displayed on the display screen of said display unit, to the eyepiece lens;
    a light shielding plate for blocking a portion of light emergent from the objective lens and being freely movable perpendicular to the optical axis of the objective lens;
    a position detection device for detecting position of the pupil of an observer brought near the eyepiece lens;
    a light shielding plate control device for controlling said light shielding plate so as to move said light shielding plate in accordance with position of the pupil of the observer detected by said position detection device; and
    a display control device for controlling said display unit in such a manner that said deflecting optical system displays the portion of the image in such area of the display screen that overlaps a region shielded by said light shielding plate.

2. The camera according to claim 1, wherein in response to movement of the position of the pupil of the observer, which is detected by said position detection device, from the optical axis of said virtual finder device, said light shielding plate control device controls said light shielding plate so as to move said light shielding plate in the direction of this movement.

3. The camera according to claim 1, wherein said light shielding plate is positioned at a position at any one of four corners of an optical image of a subject formed by said virtual finder device.

4. A method of controlling operation of a camera having a virtual finder device in which a concave lens is used as an objective lens and a convex lens is used as an eyepiece lens, said method comprising steps of:
    a solid-state electronic image sensing device imaging a subject and outputting image data representing the image of the subject;
    a display unit displaying an image, which is at least a portion of the image of the subject imaged by the solid-state electronic image sensing device, on a display screen;
    a deflecting optical system, provided between the object lens and the eyepiece lens, introducing the portion of the image, which is being displayed on the display screen of the display unit, to the eyepiece lens;
    a light shielding plate blocking a portion of light emergent from the objective lens and being freely movable perpendicular to the optical axis of the objective lens;
    a position detection device detecting position of the pupil of an observer brought near the eyepiece lens;
    a light shielding plate control device controlling the light shielding plate so as to move the light shielding plate in accordance with position of the pupil of the observer detected by the position detection device; and
    a display control device controlling the display unit in such a manner that the deflecting optical system displays the portion of the image in such area of the display screen that overlaps a region shielded by the light shielding plate.

* * * * *